Feb. 20, 1940. E. DE PERROT 2,190,977
DRIFT INDICATOR
Filed March 26, 1935 2 Sheets-Sheet 1

INVENTOR.
Ernest De Perrot
BY R. W. Smith
ATTORNEY.

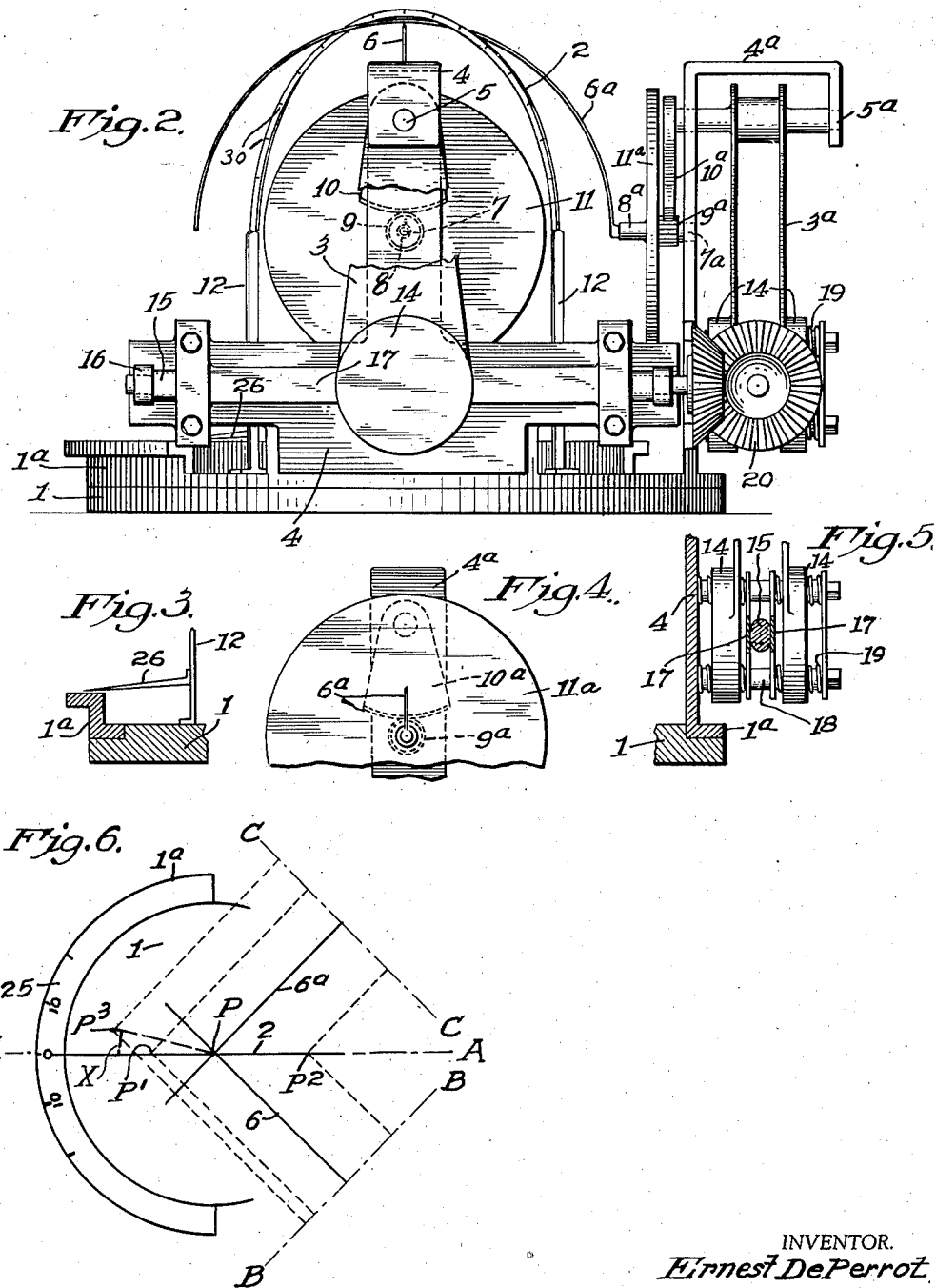

Patented Feb. 20, 1940

2,190,977

UNITED STATES PATENT OFFICE 2,190,977

DRIFT INDICATOR

Ernest de Perrot, Los Angeles, Calif.

Application March 26, 1935, Serial No. 13,067

10 Claims. (Cl. 73—151)

This invention is an instrument for indicating the drift angle of a craft propelled through a yielding medium, for example the drift angle of an airplane in flight, and the present application is a continuation in part of my copending application Serial No. 649,198, filed December 28, 1932.

It is the object of the invention to indicate drift angle, with no necessity for reference points such as celestial bodies or the earth's surface being visible.

More particularly it is the object of the invention to provide indicating means, movable responsive to acceleration of the craft at any instant, and so arranged that said movement of the indicating means will denote the angle, if any, between the heading of the craft and its path relative to the earth at the selected instant. In other words the indicating means, at the instant of reading, will denote the drift angle at that instant.

Further objects of the invention will be readily understood from the following description of the accompanying drawings, in which:

Fig. 2 is a side elevation, looking in the direction indicated at 2—2 in Fig. 1.

Figure 1:
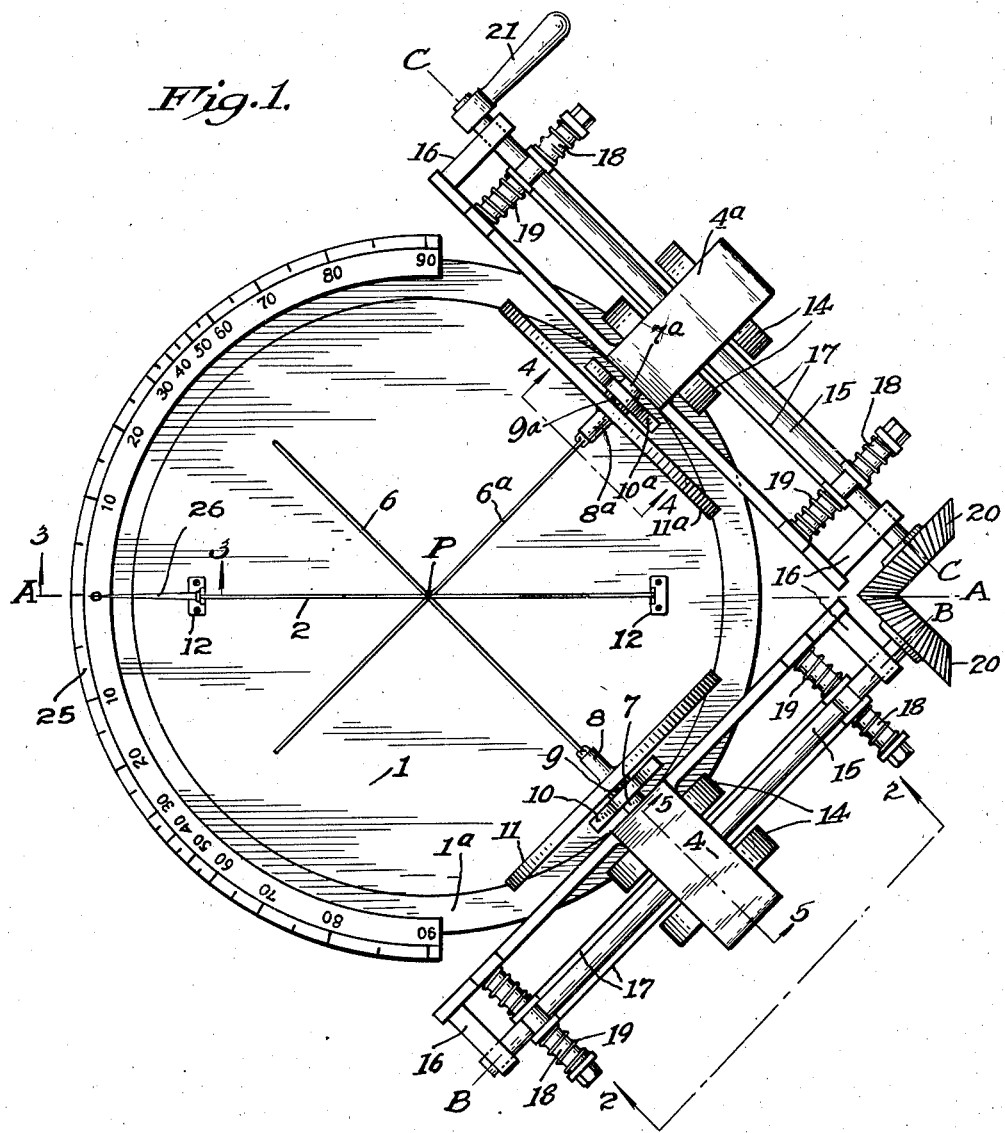
Fig. 1 is a plan view of the instrument.

Figs. 3, 4, and 5 are detail sections on the lines 3—3, 4—4 and 5—5 respectively of Fig. 1.

Fig. 6 is a diagram of the operation of the instrument.

The instrument is adapted for mounting in a craft such as an airplane, and is intended to be used at an instant when the airplane is flying on an even keel both fore-and-aft and laterally. In describing the mounting of the instrument in the airplane the terms "horizontal" and "vertical" will thus be understood as having reference to flight on an even keel. The instrument is mounted in fixed position relative to the heading of the craft, and for this purpose is shown as having a horizontal base 1 which is fixed in the airplane so that a sight line 2, carried by the base, coincides with the heading A—A of the craft.

Elements which are movable in response to change in momentum and which are shown as pendulums 3—3ª are mounted on a rim 1ª of the base 1, with the movement of each pendulum limited to a single plane; and the planes of movement of the pendulums have a predetermined relation to one another and to the heading of the craft. In practice the pendulums are preferably adapted to swing in vertical planes B—B and C—C which are at right angles to one another. The rim 1ª is preferably adapted to be turned on base 1 for a purpose hereafter described, and when the instrument is ready for use the rim 1ª is turned so that the planes B—B and C—C intersect on the heading line A—A as shown in Fig. 1.

As an instance of the mounting for the pendulums, brackets 4—4ª may project upwardly from the rim 1ª, and the pendulums are journaled in the brackets so as to swing on axes 5—5ª which are perpendicular to the planes B—B and C—C respectively.

Indicators 6—6ª are adapted for shifting responsive to oscillation of the respective pendulums, and these movable indicators cross one another with their point of intersection determined by the relative movement of the pendulums. For this purpose shafts 7—7ª may project from the inner faces of brackets 4—4ª. These shafts are in the same horizontal plane and are perpendicular to the planes B—B and C—C respectively, and when the instrument is ready for use as shown at Fig. 1, are equidistantly spaced from the heading A—A in directions parallel to the planes B—B and C—C. Sleeves 8—8ª are journaled on shafts 7—7ª, and the indicators 6—6ª are arcuate wires, preferably each of 180 degrees, having one end of each wire fixed to the inner end of one of the sleeves 8—8ª. The arcuate wires are fixed to the sleeves 8—8ª so as to swing concentrically when the sleeves are oscillated and are of so nearly the same radius as to just clear one another to permit relative swinging movement.

The sleeves 8—8ª are oscillated proportionally to oscillation of the respective pendulums 3—3ª, and as an instance of this arrangement segmental gears 10—10ª may swing with the respective pendulums, with the segmental gears meshing with pinions 9—9ª which are fixed for rotation with the respective sleeves 8—9ª. Weights 11—11ª are preferably also fixed for oscillation concentric with the respective sleeves 8—9ª, for dampening oscillatory movement produced by swing of the pendulums. When the instrument is ready for use and the pendulums 3—3ª are at rest, i. e. when they hang vertically, the arcuate indicators 6—6ª are in vertical planes and cross at a point P which in the horizontal plane coincides with the sight line 2 as shown at Fig. 1, and this sight line is preferably an arcuate strip of 180 degrees, curving over and just clearing the arcuate indicators 6—6ª as shown at Fig. 2. At its ends the arcuate strip 2 may be supported by brackets 12 which project upwardly from the base 1.

With rim 1ª turned so that planes B—B and C—C intersect at the line A—A, and as long as the pendulums 3—3ᵃ swing the same distance, the indicators 6—6ᵃ will cross at a point in the plane of the arcuate sight line 2, with this point moving either back or forth along the sight line as indicated at P¹ and P² (Fig. 6); but if the pendulums swing to different degrees the point where the indicators cross will shift to one side or the other of the sight line 2, as for example as shown at P³ (Fig. 6). The point P³ thus defines an angle X between the heading A—A and the line P³—P; and means are provided for measuring this angle. For this purpose the indicators 6—6ᵃ, when they have been shifted by movement of the pendulums 3—3ᵃ, may be locked in their shifted position.

As an instance of this arrangement the weights 14 of the pendulums 3—3ᵃ are forked, and shafts 15 extend through the forked pendulums and are journaled on brackets 4—4ᵃ as shown at 16. Except for their ends which are journaled in the bearings 16, the shafts are non-circular in cross-section so as to form cams as shown at Fig. 5, and plates 17 extend along opposite sides of the shafts 15 and through the forked pendulums, and are supported by bolts 18 which project from the brackets 4—4ᵃ. The plates 17 are slidable on the bolts 18 and springs 19 tend to laterally contract the plates. The shafts 15 are geared together as shown at 20, and a hand lever 21 is provided for rocking the shafts.

When the instrument is to be operated the lever 21 is turned so that the cam shafts 15 are rocked to the position shown at Fig. 5, whereby the plates 17 will be relatively laterally contracted by their springs 19 so as to clear the forked pendulums and thus permit free swinging movement of the pendulums. When the pendulums are swung from their normal vertical position, the lever 21 is actuated at the instant of maximum swinging movement of the pendulums, as determined by observing the instant of maximum radial deflection of the point P³ from the point P, and the cam shafts 15 are thus turned so that their cam surfaces relatively laterally expand the plates 17 against the tension of their springs 19. The plates 17 thus frictionally engage the forked ends of the pendulums and lock the pendulums in their swung position, thereby also locking the indicators 6—6ᵃ in their deflected position.

The rim 1ᵃ has a graduated scale 25, and a pointer 26 which projects from one of the brackets 12 in prolongation of the sight line 2, cooperates with this scale. Turning movement of rim 1ᵃ on the base 1 is concentric with the point P where the indicators 6—6ᵃ cross when the pendulums 3—3ᵃ are at rest; and when the instrument is ready for operation as shown at Fig. 1, the pointer 26 alines with zero of the scale 25. When the instrument has been operated and the indicators 6—6ᵃ have been locked in their deflected position, the rim 1ᵃ is turned until the point where the indicators cross, coincides with the sight line 2. In other words the rim 1ᵃ is turned an angular distance equal to the angle X which is to be measured, and the scale 25 is graduated so that the pointer 26 indicates this angle in degrees. If when the pendulums 3—3ᵃ have been swung and locked, the point of intersection of the indicators 6—6ᵃ coincides with the sight line 2 without it being necessary to turn the rim 1ᵃ, the pointer 26 will simply indicate that the angle X is zero.

The instrument is operated so that the angle X, as indicated by pointer 26, denotes the drift angle of the craft. For this purpose a time is chosen when the craft is on an even keel and moving without change in velocity, as will be denoted by the indicators 6—6ᵃ remaining stationary and crossing at the point P, and at such time the engine speed is slightly increased or decreased, so as to accelerate the craft either positively or negatively. Such acceleration causes the pendulums 3—3ᵃ to swing, thereby swinging the indicators 6—6ᵃ which are then locked in shifted position so that the angle X may be read upon the scale 25 as already described. If the reading is zero there is no drift, i. e. the ground track is in the direction of the heading of the craft; but if the rim 1ᵃ need be turned in order to aline the sight line 2 with the point P³ where the indicators cross, the reading on the scale 25 will be that of the drift angle of the craft.

The reading obtained is the drift angle within a slight range of inaccuracy, the limits of which are well within bounds allowing for successful navigation of an airplane. The cross wind which causes the drift may vary, requiring a series of readings at short intervals, but any one reading is that of the drift angle resulting from the wind blowing at the particular instant when the reading is taken, and therefore the wind will be constant for that instant no matter how much it may subsequently change. Consequently the accuracy of any one reading is in no way affected by variations in the wind.

The theory of operation whereby slight acceleration of the craft causes the indicators 6—6ᵃ to define an angle X which measures the drift angle, is based upon the fact that an airplane in flight has free motion and appreciable momentum, and the reading is taken at a particular instant and does not extend over even a short interval of time. Before the airplane is accelerated its velocity with relation to the ground, in both magnitude and direction, may be represented by a vector, the direction and magnitude of which is determined by the resultant of the velocity caused by the propeller in the direction of the heading A—A and the velocity due to some cross wind. When the craft is accelerated, the propeller force changes in magnitude and the wind force remains constant, so that a vector representing the final velocity, differs from the vector representing the initial velocity in both direction and magnitude.

However the ground track does not make an abrupt change in direction corresponding to the angular difference between the initial and final velocity vectors. The true ground track is a curved path, due to the momentum of the airplane tending to continue its flight in the direction of its initial velocity. When the craft is accelerated some interval thus elapses during which the ground track continually changes in direction until it is finally in the direction of the final velocity vector. In other words the initial velocity vector is tangent to the curve of the ground track at the start of the curve, and the final velocity vector is tangent to the curve at the end of the curve.

An airplane flies at relatively high speed and is a relatively large mass. Therefore at the start of the curved path the momentum of the craft is of relatively great magnitude and its inertia causes its speed to first remain practically constant and thereafter change at an increasing rate as the craft approaches the end of the curved path. Similarly the deflection of the craft from a straight line will be very slight at the start of the curve, the path first continuing as nearly a straight line and thereafter deflecting at an increasing rate of change as the craft approaches the end of its curved path.

In other words, the velocity increment or average acceleration for the appreciable interval during which the ground track is changing direction, is represented by a vector which is a straight line in the direction of the heading A—A, but since the velocity increment is varying non-uniformly both in direction and magnitude, the acceleration at any instant is not represented by this vector. The acceleration at any instant is represented both in magnitude and direction by the velocity of a point describing the hodograph of the motion, and this hodograph is a curved line of which the vector representing the average acceleration is a chord. The direction of the vector which at any instant represents the velocity of the point describing the hodograph is tangent to the curve of the hodograph, and therefore the direction of this vector, which represents the direction of acceleration at that instant, is at an angle to the vector representing the average acceleration, i. e. it is at an angle to the heading A—A. The magnitude of this vector representing the velocity of the point describing the hodograph is equal to the magnitude of the velocity of the point at that instant, and therefore the magnitude of this vector represents the magnitude of acceleration at that instant. Consequently the force which at any instant tends to swing the pendulums 3—3ª, is exerted in the direction of and is of a magnitude equal to this vector representing the direction and magnitude of acceleration at that instant. The components of this force, resolved in the directions of planes B—B and C—C and which components are the forces actually exerted on the respective pendulums, will thus swing the pendulums to unequal degrees so that the point of intersection of the indicators 6—6ª is angularly deflected from the heading line A—A and is also radially deflected from the point P, in accordance with the acceleration at that instant.

Throughout the curved path of travel of the craft this angular deflection from the heading A—A will change at each succeeding instant, since tangents to the curve of the hodograph will vary in direction at each succeeding point along its curve; and there will also be a change at each succeeding instant in the radial deflection from the point P, since the vectors representing the velocity of the point describing the hodograph will change in magnitude at each succeeding point along its curve. But as previously explained, the rate of change of velocity of the craft will continually increase toward the end of its curved path of travel, and of the series of vectors representing at succeeding instants the velocity of the point describing the hodograph of the motion, that vector which represents the velocity of the point as it approaches the end of the hodograph, will therefore be of greatest magnitude, and in direction will approach as a limit the direction of the vector which represents the final velocity of the craft after its acceleration. Consequently when the point of intersection of the indicators 6—6ª has the greatest radial deflection from the point P, said point of intersection of the indicators will have an angular deflection from the heading A—A, approximately equal to the angle between the heading of the craft and the straight line direction of its flight after its acceleration. The indicators 6—6ª are locked by the friction plates 17 at that instant when they show this maximum radial deflection from the point P, in so far as the skill of the navigator in using the instrument permits him to accurately catch this point which is indicated at P³ (Fig. 6), and the angle X which is then measured by the instrument thus denotes within a slight range of inaccuracy the direction of flight of the craft, i. e. its drift angle, after its acceleration.

The engine of the craft is accelerated but slightly when the instrument is used, so that the change in direction of flight resulting from such acceleration is very slight. Consequently the reading obtained from the instrument, indicating the drift angle at the end of the acceleration, also indicates approximately the drift angle before the acceleration, i. e. the drift angle when the engine is turning at the speed which is to be maintained during the flight, within a range of inaccuracy which is so slight that it may be ignored for the purpose of practical navigation. However it is possible to more accurately indicate the true drift angle of the flight, i. e. the drift angle when the engine is turning at the speed which is to be maintained except when accelerated for the purpose of taking a reading. For this purpose, before a reading is taken the engine may be accelerated in the opposite direction to that in which it is to be accelerated when taking a reading, and this initial acceleration is of the same magnitude as the opposite acceleration subsequently employed when taking a reading. After the craft has straightened out on its new course resulting from the initial acceleration, the engine is then accelerated in the opposite direction to swing the craft back to the course which it will follow when the engine is turning at the speed which is to be maintained during the flight, and the reading of the instrument is taken during this second acceleration of the engine. The reading of the instrument, indicating approximately the drift angle after this second acceleration, is therefore the drift angle of normal flight of the craft with its engine turning at the speed which it is intended to maintain.

It will be noted that the point P³ is determined by the intersection of arcuate indicators, while the reading is upon a scale 25 which is in a horizontal plane. The graduations of the scale are therefore computed by spherical trigonometry and laid out as shown at Fig. 1, so as to include the necessary corrections whereby the scale will indicate the drift angle.

The arcuate strip which forms the sight line 2 is preferably also graduated as shown at 30, so that when the indicators 6—6ª have been deflected and locked in deflected position and the drift angle has been read, the point P³ may also be read upon the scale 30 to indicate the magnitude of the acceleration to which the craft has been subjected by changing the engine speed. The drift angle and the magnitude of acceleration thus being known, and tables having been previously prepared and being available to the navigator, showing the relation of drift angle and acceleration in terms such as ground speed, wind speed and direction, and air speed, all of these aids to navigation are made available by use of the instrument.

I claim:

1. In combination, a support comprising a base having a sight line and a supporting element rotatably adjustable relative to the base concentric with a point in the sight line, a plurality of pendulous means each shiftable in a single vertical plane, cooperating means having a crossing point and mounted on the rotatable supporting element and movable by the pendulous means so that responsive to shifting of the pendulous means said crossing point is moved relative to the supporting element from a position coinciding with the said point in the sight line when the pendulous means are at rest to a position the radial direction of which from said first mentioned position is determined by shifting of the pendulous means, means for locking said cooperating means so as to lock their crossing point in moved position relative to the supporting element, and means for indicating the angular relation between the sight line and the said radial direction to the locked crossing point by rotatably adjusting the supporting element and the locked cooperating means until their locked crossing point coincides with the sight glass.

2. In combination, a support comprising a base having a sight line and a supporting element rotatably adjustable relative to the base concentric with a point in the sight line, pendulous means shiftable responsive to acceleration of the support, means for indicating a position relative to the base, said indicating means being mounted on the rotatable supporting element and movable by the pendulous means so that position relative to the base indicated by the indicating means is shiftable from position coinciding with the said point in the sight line when there is no acceleration of the support to position which in radial direction from the first mentioned position is determined by direction of acceleration of the support, means for locking the indicating means relative to the rotatable supporting element when the position relative to the base indicated by the indicating means has been radially shifted, and means for indicating the angular relation between the sight line and the direction in which the position indicated by the indicating means has been radially shifted, by rotatably adjusting the supporting element and the locked indicating means until the position indicated by the indicating means coincides with the sight line.

3. In combination, a support comprising a base having a sight line and a supporting element rotatably adjustable relative to the base concentric with a point in the sight line, shiftable pendulous means, means for indicating a position relative to the base, said indicating means being mounted on the rotatable supporting element and movable by the pendulous means so that position relative to the base indicated by the indicating means is shiftable from position coinciding with said point in the sight line when the pendulous means is at rest to position which in radial direction from the first mentioned position is determined by shifting of the pendulous means, means for locking the indicating means relative to the rotatable supporting element when the position relative to the base indicated by the indicating means has been radially shifted, and means for indicating the angular relation between the sight line and the direction in which the position indicated by the indicating means has been radially shifted, by rotatably adjusting the supporting element and the locked indicating means until the position indicated by the indicating means coincides with the sight line.

4. In combination, a support, pendulous means shiftable responsive to acceleration of the support, means for indicating a position relative to the support, said indicating means being movable by the pendulous means so that position relative to the support indicated by the indicating means is shiftable in any radial direction, included within at least a sector of a circle, from position indicated when there is no acceleration of the support to position which in radial direction and distance from the first mentioned position is determined respectively by direction and magnitude of acceleration of the support, means for locking the indicating means when the position indicated by the indicating means has been radially shifted, means cooperating with the locked indicating means for indicating the angular relation between a predetermined direction and the direction in which the position indicated by the indicating means has been radially shifted, and separate means cooperating with the locked indicating means for indicating the distance which the position indicated by the indicating means has been radially shifted.

5. In combination, a support, pendulous means shiftable responsive to acceleration of the support, means for indicating a position relative to the support, said indicating means being movable by the pendulous means so that position relative to the support indicated by the indicating means is shiftable in any radial direction, included within at least a sector of a circle, from position indicated when there is no acceleration of the support to position which in radial direction from the first mentioned position is determined by direction of acceleration of the support, means for locking the indicating means when the position indicated by the indicating means has been radially shifted, and means cooperating with the locked indicating means for indicating the angular relation between a predetermined direction and the direction in which the position indicated by the indicating means has been radially shifted.

6. In combination, a support, pendulous means shiftable responsive to acceleration of the support, means for indicating a position relative to the support, said indicating means being movable by the pendulous means so that position relative to the support indicated by the indicating means is shiftable in any radial direction, included within at least a sector of a circle, from position indicated when there is no acceleration of the support to position which in radial direction from the first mentioned position is determined by direction of acceleration of the support, means for locking the indicating means when the position indicated thereby has been radially shifted, and a single series of graduations cooperating with the locked indicating means for indicating the angular relation between a predetermined direction and the direction in which the position indicated by the indicating means has been radially shifted.

7. In combination, a support, pendulous means shiftable responsive to acceleration of the support, means for indicating a position relative to the support, said indicating means being movable by the pendulous means so that position relative to the support indicated by the indicating means is shiftable in any radial direction, included within at least a sector of a circle, from position indicated when there is no acceleration of the support to position which in radial direction from the first mentioned position is determined by direction of acceleration of the support, means for locking the indicating means when the position indicated thereby has been radially shifted, and graduations along an arc which is concentric with the first mentioned position indicated by the indicating means, said graduations and the locked indicating means cooperating for indicating the angular relation between a predetermined direction and the direction in which the position indicated by the indicating means has been radially shifted.

8. In combination, a plurality of pendulous means each shiftable in a single vertical plane, cooperating means having a crossing point and movable by the respective pendulous means so that responsive to shifting of the pendulous means said crossing point is moved from a position which it maintains while the pendulous means are at rest to a position the radial direction of which from the first mentioned position is determined by the resultant of shifting movements of the plurality of pendulous means, means for locking said cooperating means with their crossing point in moved position, and means cooperating with said locked crossing point for indicating the angular relation between a predetermined direction from the first mentioned position of the crossing point and the radial direction from the first mentioned position of the crossing point to the locked crossing point.

9. In combination, a plurality of pendulous means each shiftable in a single vertical plane, cooperating means having a crossing point and movable by the respective pendulous means so that their crossing point is moved from a position which it maintains while the pendulous means are at rest to a position the radial direction of which from the first mentioned position is determined by the resultant of shifting movements of the plurality of pendulous means, and means cooperating with said crossing point for indicating said radial direction with relation to a predetermined direction.

10. In combination, a support, a plurality of pendulous means mounted on and shiftable relative to the support responsive to acceleration of the support, the pendulous means being respectively shiftable in single vertical planes, indicating means movable by the respective pendulous means and cooperating to define a crossing point adapted for movement of the crossing point from a position when the pendulous and indicating means are at rest to a position determined by shifting of the pendulous and indicating means and the radial direction of which from the first mentioned position is determined at each instant by the direction of acceleration of the support, and means for indicating the direction of said movement of the crossing point of the indicating means relative to a predetermined direction.

ERNEST DE PERROT.